United States Patent [19]

Pardo

[11] Patent Number: 4,461,277

[45] Date of Patent: Jul. 24, 1984

[54] THERMAL ENERGY TRANSFER DEVICE

[76] Inventor: Jorge Pardo, P.O. Box 20181, Ferndale, Mich. 48220

[21] Appl. No.: 466,663

[22] Filed: Feb. 15, 1983

[51] Int. Cl.$^3$ .............................................. F24J 3/02
[52] U.S. Cl. ...................................... 126/419; 126/424; 126/429; 126/430; 126/431; 126/439; 126/435; 126/450; 165/49
[58] Field of Search .............. 126/419, 424, 425, 428, 126/429, 430, 431, 438, 439, 450, 435; 165/47 A, 48 S, 49

[56] References Cited

U.S. PATENT DOCUMENTS

| | | |
|---|---|---|
| 811,274 | 1/1906 | Carter . |
| 2,595,905 | 5/1952 | Telkes ................................ 126/419 |
| 2,625,930 | 1/1953 | Harris . |
| 3,001,331 | 9/1961 | Brunton . |
| 3,012,294 | 12/1961 | Waldor ........................... 126/429 X |
| 3,179,105 | 4/1965 | Falbel . |
| 3,244,186 | 4/1966 | Thomason et al. . |
| 3,321,012 | 5/1967 | Hervey . |
| 3,831,581 | 8/1974 | Baseley . |
| 3,860,055 | 1/1975 | Wild . |
| 3,935,897 | 2/1976 | Pulver . |
| 4,015,585 | 4/1977 | Fattor . |
| 4,026,267 | 5/1977 | Coleman . |
| 4,111,360 | 9/1978 | Barr . |
| 4,143,640 | 3/1979 | Pierce ............................. 126/438 X |
| 4,144,931 | 3/1979 | Medico, Jr. ....................... 165/48 S |
| 4,178,727 | 12/1979 | Prusinski et al. . |
| 4,184,482 | 1/1980 | Cohen . |
| 4,211,213 | 7/1980 | Nissen et al. . |
| 4,212,289 | 7/1980 | Hebert .............................. 126/428 |
| 4,223,664 | 9/1980 | Fattor . |
| 4,232,731 | 11/1980 | Kaplow et al. ..................... 165/48 S |
| 4,286,576 | 9/1981 | McClelland ........................ 126/428 |
| 4,290,416 | 9/1981 | Maloney ............................ 126/430 |
| 4,304,218 | 12/1981 | Karlsson ........................... 126/419 |
| 4,424,804 | 1/1984 | Lee .................................. 126/430 |

FOREIGN PATENT DOCUMENTS

| | | | |
|---|---|---|---|
| 2422116 | 12/1979 | France ............................ 126/424 |
| 134835 | 10/1979 | Japan .............................. 126/419 |
| 2029565 | 3/1980 | United Kingdom ................ 126/424 |

OTHER PUBLICATIONS

"Dow Introduces Solar Panels", *The Detroit News*, Jan. 1983.
"Developmental Product Technical Data Sheet for XF-43176 (TESC-135)", The Dow Chemical Co., Oct. 1981.
"Developmental Product Technical Data Sheet for XFS-43076 (TESC-81)", The Dow Chemical Co., Oct. 1981.

*Primary Examiner*—Samuel Scott
*Assistant Examiner*—Margaret A. Focarino
*Attorney, Agent, or Firm*—Harness, Dickey & Pierce

[57] ABSTRACT

A thermal energy device is disclosed and generally includes one or more collector means for receiving and storing thermal energy, movable thermal reflector means, fixed thermal reflector means, and actuation apparatus for rotating the movable thermal reflector means about said collector means. The movable thermal reflector means preferably include thermal insulation means for preventing undesirable heat gain or loss and are rotated between a first position wherein the reflector means are positioned between the collector means and the interior of a building structure and function to reflect and concentrate exterior ambient thermal energy on to the collectors for storage therein. The movable thermal reflector means is also rotatable to a second position generally between the collector means and the exterior of the building structure in order to reflect and disperse previously-stored thermal energy from said collector means into the interior of a building structure. Such positions and rotations may be reversed during warm weather to collect thermal energy from the interior of the building and discharge such energy to the exterior surroundings. Furthermore, the reflectors may be rotated to positions intermediate said first and second positions, if desired, to maximize light transmission when heating and cooling are not necessary. The energy transfer device may also optionally include various devices and apparatus for automatically rotating the movable thermal reflector means in response to predetermined conditions, for providing convective heat transfer and dispersal, as well as various other optional features.

35 Claims, 7 Drawing Figures

THERMAL ENERGY TRANSFER DEVICE

BACKGROUND AND SUMMARY OF THE INVENTION

The invention relates generally to energy collection and transfer apparatus and more specifically to such apparatus for heating and cooling building structures primarily by means of the collection and dissipation of solar and other radiant energy, as well as by convective and conductive heat transfer.

The dramatic increase in the cost of energy in recent years, coupled with the concern for conservation of non-renewable energy sources, has encouraged the development of various devices and systems for converting solar energy into more readily-usable energy forms as well as for reducing the energy used in heating and cooling building structures. Such prior developments include various collection devices positioned for direct exposure to the sun, various devices for directing and concentrating the sun's radiant energy onto thermal collectors, and apparatus for selectively blocking such exposure to the sun's rays under predetermined conditions. While many of such prior devices have been found to be fairly effective, they have frequently been inordinately expensive and complex. Furthermore, many of such prior developments have not taken full advantage of the potential of solar energy for year-around heating and cooling purposes, both during the day and the night, and have generally required additional apparatus or systems for cooling the interior of building structures. The need has continued, therefore, for relatively simple and inexpensive solar energy transfer systems which efficiently and effectively convey the stored thermal energy to the interior of the building structure and which also may be used to cool the building or to supplement the building's conventional cooling system in order to reduce energy usage and cost on a year-around basis.

In accordance with the present invention, a thermal energy transfer device adapted for installation in an exterior wall or roof of a building structure generally includes collector means for receiving and storing thermal energy from either the exterior or interior of the building structure. The device also includes movable thermal reflector means, which are preferably thermally insulated, for alternatively concentrating thermal energy from the surroundings on to the collector means or dispersing thermal energy from the collector means into the surroundings, and actuating means for rotating the movable reflector means about the collector means in order to accomplish such alternative purposes. Preferably, the thermal energy transfer device includes redundant fixed reflector means which cooperate with the movable reflector means to optimize the amount of energy collected or dispersed. The device may also optionally include movable reflectors and other components that are transparent or semi-transparent, thereby making the device especially applicable for window installations.

Additional advantages and features of the present invention will become apparent from the following description and from the appended claims taken in conjunction with the accompanying drawings.

DETAILED DESCRIPTION OF THE PREFERRED EMBODIMENTS

FIGS. 1 through 5 of the drawings depict exemplary preferred embodiments of an energy transfer device according to the present invention as installed in an exterior wall of a building structure for purposes of illustration only. One skilled in the art will readily recognize from the following discussion that the principles of the invention are equally applicable to installations of the thermal energy transfer device in a roof or other exterior building panels and to energy transfer apparatus other than that shown in the drawings.

Figure 1:
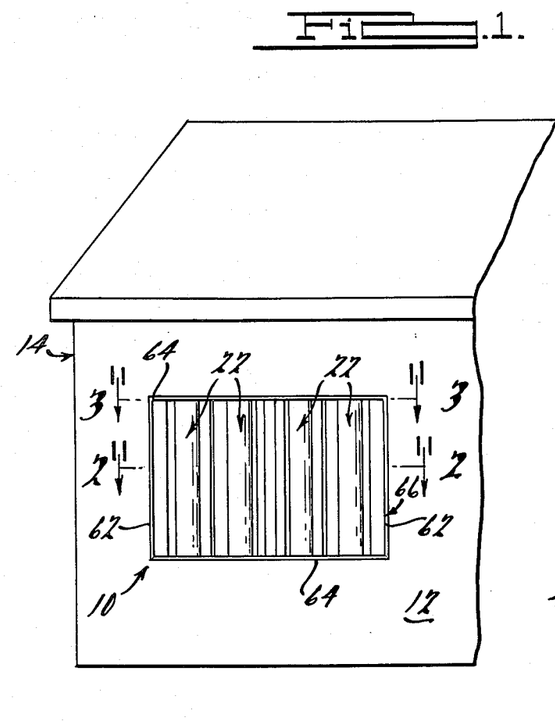
FIG. 1 depicts a partial elevational perspective of a building structure, illustrating an exemplary installation of a thermal energy transfer device according to the present invention.

In FIG. 1, an exemplary energy transfer device according to the present invention is indicated generally by reference numeral 10 and is shown for purposes of illustation as installed in an exterior wall 12 of a building structure 14. The energy transfer device 10 may alternatively be installed in a roof or other exterior partition of the building structure 14. As is further illustrated in FIGS. 2 and 3, the energy transfer device 10 generally includes a number of high-capacity thermal energy collectors 22, a corresponding number of associated movable thermal reflectors 24 (which preferably also serve as insulators), at least a pair of fixed thermal reflectors 26, and a frame structure 28 generally surrounding and supporting the other components of the energy transfer device. Although the energy transfer device 10 is shown in the drawings with its axially-extending collectors 22 in a vertical orientation, it should be emphasized that the collectors may alternatively be disposed in horizontal or other orientations.

In one form of the invention, each of the thermal energy collectors 22 includes a generally hollow outer casing 32, which has a thermally absorptive outer surface and is closed at both ends, forming a central hollow core 34 therein. Contained within the core 34 is a high thermal capacity material 36 capable of collecting and storing energy. Such materials, may be of the phase-change type well-known to those skilled in the art and have the capability of being solid generally at a preselected desired room temperature and have a phase change temperature in a comfort range of approximately 60 F. to approximately 90 F. in order to melt and become liquid generally at such room temperature when exposed to excess thermal energy such as that from the sun's rays. Consequently, when exposed to a decreased surrounding temperature, the phase change material will convert from its liquid phase to its solid phase, giving off the previously-stored thermal energy in the process. An example of a phase change material generally applicable for such purposes may be found in U.S. Pat. No. 4,178,727, issued to Prusinski et al, on Dec. 18, 1979. Another example is a material manufactured by Dow Chemical Co. and sold under the designation TESC-81 (XFS-43076). This Dow material comprises formulated chloride hexahydrate and is a thermal energy storage compound having a melting and solidification point of 81 F. Other examples of such conventional phase change materials convert from a liquid to a gaseous phase when subjected to excess thermal energy and revert back to a liquid phase when exposed to decreased surrounding temperatures, with such phase changes taking place generally at the above-mentioned temperatures.

Alternatively, thermal energy collectors composed of other high thermal capacity (high specific heat) materials such as concrete or other high density materials well-known to persons skilled in the art may be employed in lieu of, or in combination with, the phase change materials within the thermal energy collectors 22 shown in the drawings and described above. Such alternate collectors may or may not require an outer casing, depending upon the type of materials used therein. Whether or not such a casung is required, the collectors should have thermally aborptive outer surfaces.

Generally speaking, each of the movable thermal reflectors 24 includes a thermally reflective, concave inner surface 42 facing toward the collectors 22. Such inner surface 42 extends in an axial direction generally parallel to its associated collector 22. The inner surface 42 has an axially-extending focal locus spaced therefrom and located such that the associated collector 22 is positioned generally along such focal locus. Each of the movable thermal reflectors 24 also preferably includes a convex outer surface 44 facing away from its associated collector 22.

In the preferred embodiment, the movable reflectors 24 include thermal insulation 48 disposed between the inner and outer surfaces 42 and 44, respectively, and contained therein by lateral edge portions 46. Although the thermal insulation 48 is depicted in the drawings as being composed of a fiberous or other solid material, such as that known to those skilled in the art, other forms and types of thermal insulation, including a dead air space, may alternatively be employed. Additionally, the movable reflectors 24, themselves, may be composed of materials having high thermal insulating characteristics. The thermal reflectors 24 also sealingly engage each other, as described below, to prevent undesirable heat gains or losses across the thermal energy device.

Figure 2:
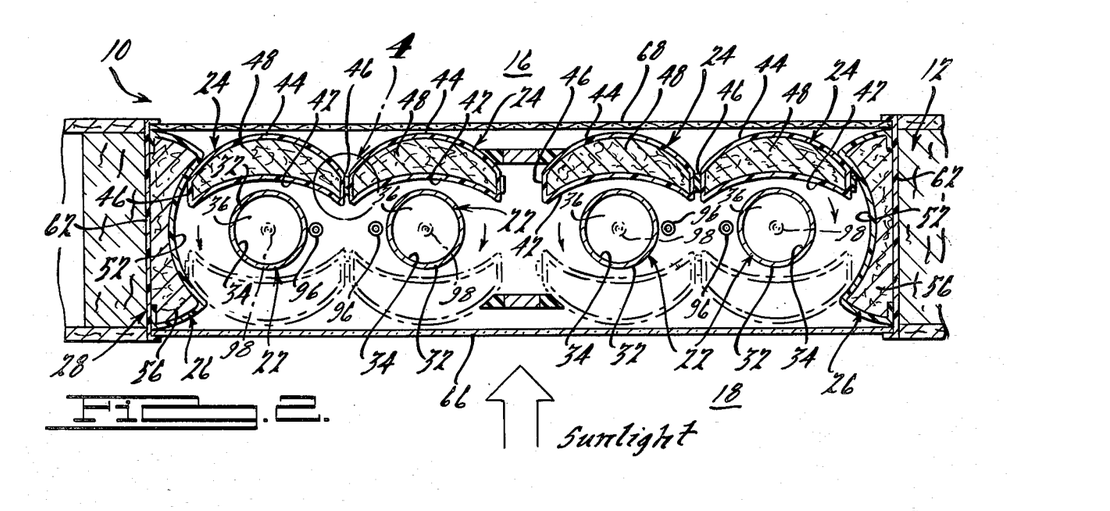
FIG. 2 is a sectional view taken along line 2—2 of FIG. 1, illustrating the movable reflectors of the energy transfer device in a first rotated position.

As is described in more detail below, an actuating apparatus functions to rotate each of the movable thermal reflectors 42 about its associated thermal energy collector 22 from a first position indicated in solid lines in FIG. 2, wherein the movable thermal reflector is positioned between its associated collector 22 and the interior 16 of the building structure 14, a second position indicated by solid lines in FIG. 3 wherein the movable thermal reflectors 24 are positioned between their associated collectors 22 and the exterior 18 of the building structure, and any third position intermediate the first and second positions. The movable thermal reflectors 24 are rotatable about their associated collectors 22 in such a manner that their inner surfaces 42 are preferably maintained in an orientation facing their associated collectors 22 as the movable reflectors are rotated to or between their first, second and third positions.

Figure 4:
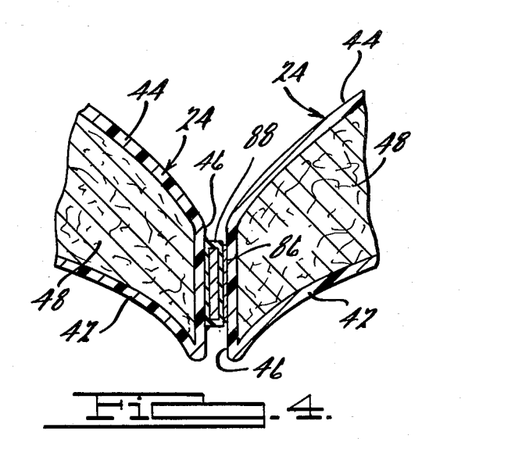
FIG. 4 is an enlarged, detailed sectional view of the lateral edge areas of the movable thermal reflectors, illustrating sealing means therebetween.

As is shown in FIG. 4, each of the movable thermal reflectors 24 may optionally have a metal or magnetic strip 86 on one of its edge portions 46 and a magnetic sealing strip 88 on the opposite edge portion 46. Such magnetic sealing apparatus may be of the general type and configuration commonly found on doors for refrigerators or freezers. Thus, when the movable thermal reflectors 24 are rotated to their first or second positions, the laterally-adjacent pairs of such movable reflectors abuttingly engage one another at their edge portions 46 and are substantially sealed to one another by means of the magnetic engagment of the magnetic strip 86 with the magnetic sealing strip 88. Alternatively, other mutually enageable sealing means, such as resilient gaskets, for example, known to those skilled in the art may be employed.

The thermally reflective inner surface 42 and the outer surface 44 of each of the movable thermal reflectors 24 are preferably opaque but may optionally be transparent or semi-transparent in order to allow the transmission of light therethrough into the interior 16 of the building structure. Whether the outer surface 44 is opaque, transparent, or semi-transparent, it may optionally be composed of a thermally reflective material or include a thermally reflective coating thereon for purposes of further minimizing radiant heat transfer to or from the interior 16 of the building structure. Alternatively, if the outer surface 44 is opaque, it may include a decorative covering suited to blend with, or aesthetically complement, either the exterior or interior surfaces, or both, of the wall partition 12.

In the preferred form of the present invention, the fixed thermal reflectors 26 each include an axially-extending lateral surface 52 disposed near opposite lateral ends of a battery of thermal energy collectors 22 and associated movable thermal reflectors 24. Each lateral surface 52 is concave in configuration and is thermally reflective for redundantly reflecting and concentrating thermal energy from the surroundings onto the collectors 22 or for reflecting and dispersing thermal energy therefrom into said surroundings as is discussed in more detail below. Preferably, each fixed thermal reflector 26 includes thermal insulation 56 on the opposite side of its lateral surface 52 from the collectors 22. Like the thermal insulation 48, discussed above, the thermal insulation 56 may comprise any of a number of insulating materials or compositions well-known to those skilled in the art.

The exemplary energy transfer device 10, shown for purposes of illustration in the drawings, includes a frame structure 28 as mentioned above. However, one skilled in the art will readily recognize that the collectors 22, the movable thermal reflectors 24, the fixed thermal reflectors 26, and other components and apparatus of the energy transfer device may optionally be mounted or attached to a frame or other strucutral member that is part of the exterior wall partition 12 of the building structure. The frame structure 28 shown in the drawings preferably includes a pair of spaced-apart lateral frame members 62 extending generally parallel to the collectors 22 and disposed laterally outward from the lateral surfaces 52 of the fixed thermal reflectors 26. Preferably, the fixed thermal reflectors 26 are secured to, or integrally formed with, the lateral frame members 62. The lateral frame members 62 are interconnected by a pair of horizontal frame members 64 (see FIG. 1) to form the generally rectangular frame structure 28. The frame structure 28 also includes an exterior barrier 66 which is preferably a glazing material, such as glass or plastic, for example, which is transparent to radiant thermal energy transfer but substantially impervious to convective energy transfer. The exterior barrier 66 is substantially sealingly connected to the outer edges of the lateral and horizontal frame members 62 and 64, respectively, in order to prevent or minimize undesirable infiltration of outside air into the interior 16 of the building structure and loss of thermal energy therefrom.

The frame structure 28 preferably includes a perforate interior panel 68 attached and substantially sealed to the interior edges of the frame structure 28. The perforate panel 68 may be composed of a perforate screen-type material of metal, plastic, or other suitable materials, and is transparent to radiant and convective heat transfer. The perforate barrier 68 may also be decorative to complement the interior 16 of the building structure.

The energy transfer device 10 also includes actuation apparatus, generally indicated by reference numeral 80, for rotating the movable thermal reflectors to and from their first, second and third positions described above. At both ends of each of the movable thermal reflectors 24, the actuation apparatus 70 generally includes a rotatable collar 72 disposed around the associated collector 22 for slidable rotation relative thereto. The collar 72 is secured to its associated movable thermal reflector 24, by way of adjustment rods 110 and tie rods 116, and serves as a pulley or sheave which is rotatably actuated by a cord or chain 78 to rotate the thermal reflector 24. The cord or chain 78 preferably engages the various collars 72 in the energy transfer device in such a manner that actuation of the cord 78 causes laterally-adjacent collars 72 to rotate in a coordinated manner in opposite directions thereby correspondingly rotating each pair of laterally-adjacent movable thermal reflectors 24 in a coordinated manner in opposite directions. Thus, for example, the movable thermal reflector 24 at the leftward end of the energy transfer device, as viewed in FIG. 3, preferably rotates in a clockwise direction when rotated from its second position shown in phantom lines to its first position shown in solid lines. Accordingly, the next laterally-adjacent movable thermal reflector in FIG. 3 preferably moves in a counterclockwise direction when rotated from its second position to its first position. The remaining movable reflectors, as viewed from left to right in FIG. 3, are rotated by the actuation apparatus 70 in alternate clockwise and counterclockwise directions in order to prevent the reflectors from interfering with each other during rotation. Furthermore, to prevent such interference between laterally-adjacent pairs of the movable thermal reflectors, each such pair is preferably separated by axially-extending insulated stop members 77. Each of the insulated stop members 77 preferably includes a sealing strip 79 at each of its lateral edges for sealingly engaging the movable thermal reflectors 24 to minimize the infiltration of outside air into the interior 16. Preferably, the upper and lower ends of the movable reflectors 24 each include a sealing member 90 for providing a seal between the movable reflectors and both the collars 72 and the frame members.

The cord or chain 78 may be actuated manually by pull cords to rotate the pulleys 76 and the movable thermal reflectors 24. Alternatively, an automatic control system, illustrated only schematically in FIG. 3 includes automatic actuators 82 which operate to rotate the movable thermal reflectors 24 in response to predetermined conditions. As will readily be appreciated by those skilled in the art, the control system may optionally include a temperature or radiant energy sensor 84, such as a photoelectric sensor, for example, and associated conventional controls for automatically rotating the movable thermal reflectors 24 in response to a preselected temperature or light levels in the region between the thermal reflectors 24 and the exterior barrier 66 in order to detect the presence of predetermined thermal energy levels therein. The control system may thus be employed to automatically regulate the energy transfer device 10 as is described in more detail below. Alterantively, the optional automatic control system may include conventional timer means (not shown) and associated conventional controls for rotating the movable thermal reflectors 24 at preselected times of the day.

Figure 5:
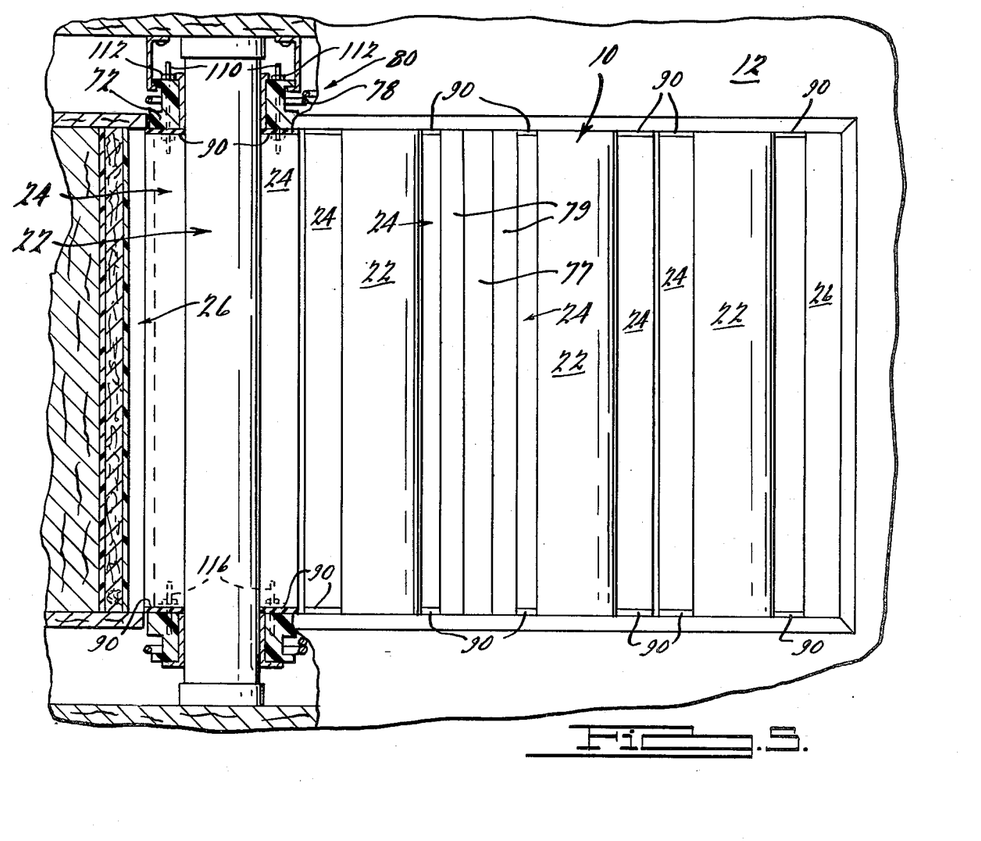
FIG. 5 is an elevational view of an exterior wall of a building structure, viewed from the interior thereof, illustrating the thermal energy transfer device of FIG. 1 and the details of the construction thereof.
Figure 6:
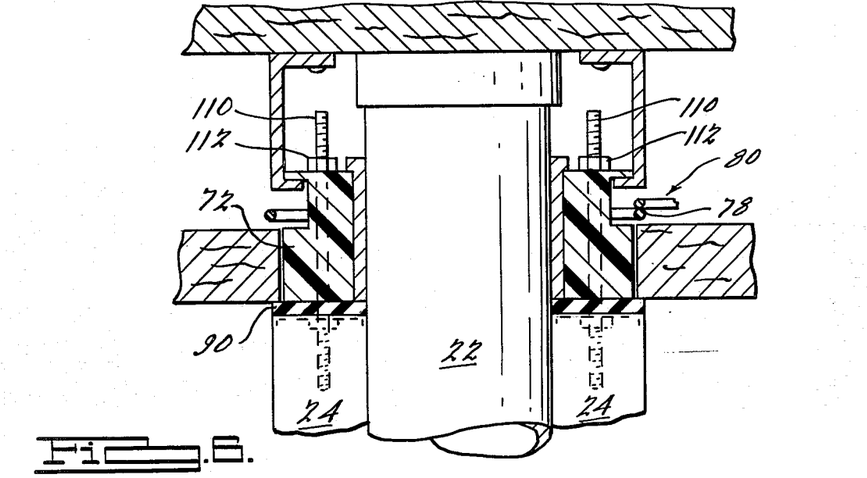
FIG. 6 is an enlarged detailed view of the upper end of one of the collector and movable reflector assemblies, illustrating the details of the construction thereof.

Referring to FIGS. 5 and 6, wherein the thermal energy device 10 is in a vertical orientation, the collar 72 at the upper end of each collector/movable reflector assembly is preferably secured to its associated movable reflector 24 by a number of threaded ajdustment rods 110 which extend through the collar 72 and are fixedly secured to the movable reflector 24 to support the reflector with the rods 110 in tension loading. An internally threaded nut 112 threadably engages the upper end of each adjustment rod 110 and bears against the collar 72. By rotating the nuts 112, the vertical position of the associated movable reflector may be raised or lowered to facilitate the free rotation thereof between the upper and lower collars 72. The lower tie rods 116 are fixedly secured to their associated movable reflectors 24, but are only slidably received in corresponding bores in the lower collar 72. The tie rods 116 thus serve to laterally align the movable reflectors with the lower collars 72 and to transmit rotation of the lower collars to their associated movable reflectors. One skilled in the art will readily recognize that similar supporting apparatus may be employed in installations wherein the thermal energy device is oriented other than vertically.

Figure 7:
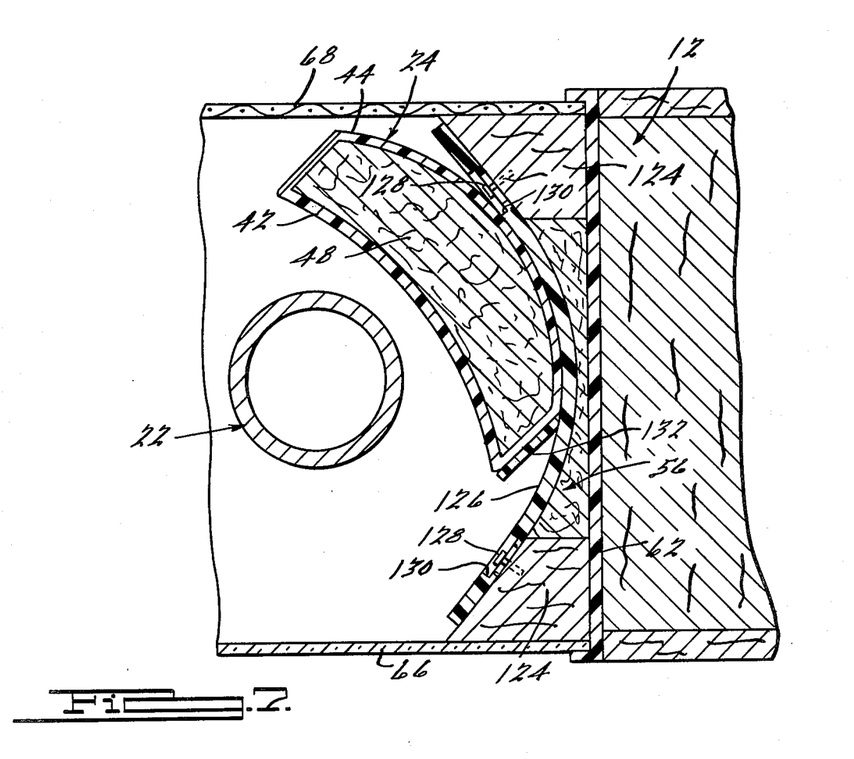
FIG. 7 is an enlarged partial section view of the energy transfer device, similar to that of the full view shown in FIG. 2, but illustrating an optional deflectable fixed reflector.

FIG. 7 illustrates an optional construction and configuration of the fixed thermal reflectors. In such an optional arrangement, the fixed thermal reflectors 26 of FIGS. 1 through 6 are replaced by at least a pair of support members 124 and optional fixed thermal reflectors 126. The optional fixed thermal reflectors are generally resilient and flexible in order to deflect as they are slidingly engaged by the associated movable reflectors 24 as the movable reflectors are rotated to their various positions.

In order to provide for a tight sealing engagement with the movable reflectors 24, the optional fixed thermal reflectors are urged into a generally concave configuration and attached to the support members such that they are internally and resiliently biased generally toward their adjacent collectors 22. Thus, when the movable reflectors 24 are rotated into sliding engagement with the optional fixed reflectors 126, the fixed reflectors 126 resiliently deflect to sealingly conform to the engaged portion of the movable reflectors and to be sealingly and slidingly engaged by a sealing strip or member 132 on at least one edge portion of the movable reflectors. The internal resilient biasing force of the reflectors 126 maintains such sealing engagement during the movement of the movable reflectors in order to substantially prevent undesirable air flow between the fixed and movable reflectors.

In order to accommodate the resilient deflection of the optional fixed thermal reflectors 126, guide fasteners 128 are received within elongated slots 130 in the reflectors 126 and are secured to the support members 124. The elongated slots 130 are recessed or countersunk to allow the heads of the guide fasteners 128 to be disposed beneath the surface of the reflectors 126, thereby avoiding interference between the guide fasteners 128 and the movable reflectors 24. Such a construction permits a limited slidable movable movement of the optional fixed reflectors 126 relative to the support members as they deflect.

The operation of the energy transfer device 10 of the present invention may be described generally as follows. For winter or other cold weather operation, the movable thermal reflectors 24 are rotated during daylight hours to their first positions between the collectors 22 and the perforate panels 68, as shown in solid lines in FIG. 2, in order to reflect and concentrate solar energy or other radiant thermal energy from the surroundings onto the collectors 22. Additionally, the redundant fixed thermal reflectors 26 or 126 also reflect and concentrate ambient thermal energy from the exterior of the building structure onto the collectors, as well as reflecting and concentrating thermal energy from the collectors back to the collectors themselves. Thus during daylight hours, the collectors 22 receive and store thermal energy both by direct radiant heat transfer and by reflected radiant heat transfer. If the high thermal capacity collectors employed in the thermal energy transfer device are the phase change type described above in connection with one form of the invention, the material 36 within the core 34 of the collectors undergoes a phase change from the solid phase to the liquid phase (or alternatively from the liquid phase to the gaseous phase) in order to store such thermal energy. If sufficient ambient thermal energy is available such phase change material will also increase in temperature, thereby storing additional amounts of thermal energy. Similarly, if the collectors 22 are the high-density type described above in connection with another form of the invention, such high-density material will increase in temperature to store thermal energy, but without undergoing a change in phase.

Figure 3:
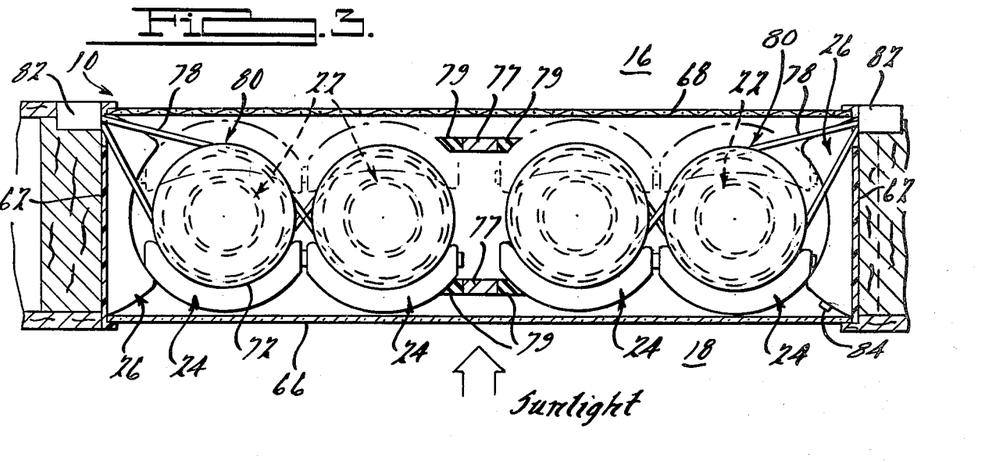
FIG. 3 is a sectional view taken along line 3-3 of FIG. 1, illustrating the movable thermal reflectors rotated to a second position and further illustrating an actuation system for the movable reflectors.

During the night hours in such winter mode of operation, the movable thermal reflectors 24 are rotated to their second positions between the collectors 22 and the exterior barrier 66, as shown in solid lines in FIG. 3, and function to reflect and disperse the previously-stored thermal energy from the collectors 22 to the interior 16 of the building structure. Simultaneously, the redundant fixed thermal reflectors 26 or 126 also reflect and disperse such stored thermal energy from the collectors to the interior of the building structure. During such dispersal of thermal energy into the building interior, the phase change material 36, in the case of the phase change type of collectors 22, lowers in temperature and undergoes another phase change from liquid to solid, (or alternatively from gaseous to liquid) in order to give off its previously-stored thermal energy. In the case of the high-density type thermal collectors, the high-density material also lowers in temperature to give off stored thermal energy, but without undergoing a change in phase. It should also be noted that in the preferred embodiment, wherein the movable thermal reflectors include thermal insulation 48 therein, such movable reflectors also serve to insulate both the interior 16 of the building structure and the collectors from the exterior 18 and to minimize the heat loss across the energy transfer device 10.

In the summer mode of operation, the above-described rotations of the movable thermal reflectors 24 are reversed. During the daylight hours, the movable thermal reflectors 24 are rotated to their second positions between the collectors 22 and the exterior barrier 66, as shown in solid lines in FIG. 3, in order to shade the interior 16 of the building structure from undesirable heat gain by way of radiant heat transfer of solar energy. Also, the thermal energy in the interior 16 of the building structure is reflected and concentrated onto the collectors 22 by the movable thermal reflectors 24 and the fixed thermal reflectors 26 or 126 in order that said energy may be absorbed by the collectors, thereby cooling the interior of the building. Conversely, during the night hours, the movable thermal reflectors 24 are rotated to their first positions between collectors 22 and the perforate panel 68, as shown in solid lines in FIG. 2, in order to reflect and disperse the previously-stored thermal energy from the collectors 22 to the cool dark exterior 18 of the building structure primarily by means of the radiant heat transfer. During both daylight hours and night hours, the energy transfer device 10 preferably insulates the interior 16 of the building structure from the exterior 18 by means of thermal insulation 48 and 56, in the movable and fixed reflectors, respectively.

During moderate temperature conditions, such as in the spring or fall, the thermal reflectors 24 may be rotated to any third position, intermediate the first and second positions, described above. Such intermediate positions allow the direct transmission of light into the interior of the building structure when heating or cooling is not necessary or desired.

If the optional automatic control system, described above and shown schematically in FIG. 3, is employed in conjunction with the energy transfer device 10, the control system may optionally include a so-called "summer/winter switch" and associated conventional controls, both of which are well-known to those skilled in the art. By use of such a summer/winter switch the automatic control system may be manually, or even automatically, switched to convert the energy transfer device 10 from its summer mode of operation to its winter mode of operation and vice versa.

A number of additional optional variations on the energy transfer device 10 as described above may be employed to further maximize the utility of the system or to adapt the system to the conditions or requirements of a given application. For example, the thermal energy device may even alternately include an interior barrier (not shown) that is integral with the interior side of the wall partition and includes upper and lower louvres or registers. By providing such louvres in such an integral interior barrier, air in the interior of the building structure may circulate through, and be convectively heated by, the energy transfer device by passing first through the lower louvre, flowing over the collectors, and then exiting into the interior of the building structure through the upper louvres. It should also be noted that although such integral interior barrier may alternately be employed, the perforate panel 68 is preferred and is believed to more efficiently employ the principles of the invention.

It should also be emphasized that in any of the embodiments described herein, convective heating by means of interior air passing through the energy device 10 is supplemental to the primarily-radiant heat transfer previously described and further that at least some degree of conductive heat transfer between the collectors and the structural components of the energy transfer device 10 and the building structure 14 also serves to transfer thermal energy into or from the interior 16 of the building structure.

Another optional variation on the energy transfer system described above includes the addition of conduits 96 (as shown in solid lines in FIG. 2), which contain water or other heat transfer fluids and extend in an axial direction generally parallel to, and between, laterally-adjacent collectors 22. Such conduits serve to convey the water or other heat transfer fluid to the energy transfer device 10 in close proximity to the collectors 22 in order to transfer thermal energy from the collectors to the water or other heat transfer fluid, thereby raising its temperature and returning it to the building structure in order to supplement a conventional water heating apparatus or other energy conversaion device. Alternatively, or additionally, such conduits 96 may be connected to conventional interior cooling apparatus and may be used during the warm weather months to supply cooled water or other cooled heat transfer fluids to the energy transfer device 10 in order to supplement the cooling of the interior and even more effectively remove the thermal energy previously received and stored by the collectors 22 from the interior 16 of the building structure. Alternatively, the conduits may be disposed within the collectors themselves, such as illustrated by conduits 98 (shown in phantom lines in FIG. 2), in order to concentrate and transfer energy to or from the conduits 98 directly by way of conductive or convective energy transfer. Such conduits 98 may be employed either in lieu of the conduits 96 or in addition thereto.

The foregoing discussion discloses and describes exemplary embodiments of the present invention. One skilled in the art will readily recognize from such discussion that various changes, modifications and variations may be made therein without departing from the spirit and scope of the invention as defined in the following claims.

What is claimed is:

1. A thermal energy transfer device adapted for installation in an exterior wall or roof of a building structure, said energy transfer device comprising:
   at least one high thermal capacity collector means for receiving and storing thermal energy, said collector means extending in an axial direction;
   movable thermal reflector means for reflecting thermal energy to said collector means, said movable reflector means having a thermally reflective concave inner surface thereon facing toward said collector means and a convex outer surface facing away from said collector means, said movable reflector means extending in an axial direction generally parallel to but spaced from said collector means;
   at least one fixed reflector means extending in an axial direction generally parallel to but spaced from said collector means and being disposed laterally of said movable reflector means and said collector means, said fixed reflector means having a thermally reflective concave lateral surface thereon facing toward said collector means; and
   actuating means for rotating said movable reflector means about said collector means to a first position wherein at least a portion of said movable reflector means is positioned between said collector means and the interior of building structure, to a second position wherein at least a portion of said movable reflector means is positioned between said collector means and the exterior of said building structure, or to any third position intermediate said first and second positions, said inner surface facing said collector means as said movable reflector means is rotated to or between any of said first, second and third positions.

2. A thermal energy transfer device according to claim 1, wherein said movable reflector means includes thermal insulation means between said inner and outer surfaces.

3. A thermal energy transfer device according to claim 1, wherein said thermally reflective concave inner surface has a focal locus spaced therefrom, said collector means being positioned generally along said focal locus, said movable reflector means being adapted to reflect and concentrate thermal energy from the surroundings onto said collector means and further being adapted to reflect and disperse thermal energy from said collector means into the surroundings.

4. A thermal energy transfer device according to claim 3, wherein said inner and outer surfaces of said movable reflector means are at least semi-transparent.

5. A thermal energy transfer device according to claim 3, wherein at least the outer surface of said movable reflector means is opaque.

6. A thermal energy transfer device according to claim 1, wherein said thermally reflective lateral surface has a focal locus spaced therefrom, said collector means being positioned generally along said focal locus, said fixed reflector means being adapted to reflect and concentrate thermal energy from the surroundings onto said collector means and further being adapted to reflect and disperse thermal energy from said collector means into the surroundings.

7. A thermal energy transfer device according to claim 6, wherein said fixed reflector means includes thermal insulation means on the opposite side of said lateral surface from said collector means.

8. A thermal energy transfer device according to claim 1, wherein said high thermal capacity collector means comprises a generally hollow closed casing containing a phase change material therein, said phase change material having a phase change temperature in a comfort range of approximately 60 F. to approximately 90 F.

9. A thermal energy transfer device according to claim 8, wherein said casing has a thermally absorptive outer surface.

10. A thermal energy transfer device according to claim 1, wherein said high thermal capacity collector means comprises a high-density material adapted to rise in temperature when exposed to thermal energy in order to store said thermal energy therein said adapted to release said stored thermal energy when exposed to surroundings having a level of said thermal energy lower than that of said stored thermal energy.

11. A thermal energy transfer device according to claim 10, wherein said collector means has a thermally absorptive outer surface.

12. A thermal energy transfer device according to claim 10, wherein said high-density material is surrounded by a casing having a thermally absorptive outer surface.

13. A thermal energy transfer device according to claim 1, further comprising convection means for circulating air from the interior of said building structure along said collector means in contact therewith and back into the interior of said building structure in order to raise or lower the temperature of said air.

14. A thermal energy transfer device according to claim 1, further comprising conduit means extending within said collector means, said conduit means being adapted to convey a fluid therethrough, whereby thermal energy is transferred directly to and from said conduit means by way of contact therewith.

15. A thermal energy transfer device according to claim 14, wherein said means is adapted to convey a relatively cold fluid from said building structure to said energy transfer device to be heated and returned to said building structure at an elevated temperature.

16. A thermal energy transfer device according to claim 1, further comprising conduit means extending generally adjacent and generally parallel to said collector means, said conduit means being adapted to convey a fluid therethrough, said movable reflector means reflecting thermal energy onto said conduit means in order to raise the temperaure of said fluid as it is conveyed therethrough.

17. A thermal energy transfer device according to claim 16, wherein said conduit means is adapted to convey a relatively cold fluid from said building structure to said energy transfer device to be heated and returned to said building structure at an elevated temperature.

18. A thermal energy transfer device, according to claim 1, wherein said actuating means includes control means for automatically rotating said movable reflector means from said first position to said second position in response to predetermined ambient radiant energy levels on the exterior of said building structure.

19. A thermal energy transfer device adapted for installation in an exterior wall or roof of a building structure, said energy transfer device comprising:
   at least one high thermal capacity collector means for receiving and storing thermal energy, said collector means extending in an axial direction,
   movable thermal reflector means for reflecting thermal energy to said collector means, said movable reflector means having a thermally reflective concave inner surface thereon facing toward said collector means and a convex outer surface facing away from said collector means, said movable reflector means extending in an axial direction generally parallel to but spaced from said collector means;
   actuating means for rotating said movable reflector means about said collector means to a first position wherein at least a portion of said movable reflector means is positioned between said collector means and the interior of building structure, to a second position wherein at least a portion of said movable reflector means is positoned between said collector means and the exterior of said building structure, or to any third position intermediate said first and second positions, said inner surface facing said collector means as said movable reflector means is rotated to or between any of said first, second and third positions;
   a frame structure generally surrounding said movable reflector means and said collector means, said frame structure including at least a pair of spaced-apart frame members disposed generally laterally of said movable reflector means and said collector means and extending generally parallel to said collector means, an exterior barrier being at least semi-transparent and disposed between the exterior of said building structure and said movable reflector means and said collector means, said exterior barrier being substantially sealingly attached to exterior portions of said frame structure to substantially isolate said movable reflector means and said collector means from the exterior of said building structure, said frame structure being adapted for installation in an opening in said wall or roof, said frame structure further including a perforate interior panel being disposed between the interior of said building structure and said movable reflector means and collector means; and
   a thermally reflective concave lateral surface disposed generally on each of said spaced-apart frame members and facing toward said collector means, said lateral surface having a focal locus spaced therefrom, said collector means being positioned generally along said focal locus, said lateral surface being adapted to reflect and concentrate thermal energy from the surroundings onto said collector means and further being adapted to reflect and disperse thermal energy from said collector means into the surroundings.

20. A thermal energy transfer device, according to claim 19, wherein said actuating means includes control means for automatically rotating said movable reflector means from said first position to said second position when the temperature between said collector means and said exterior barrier reaches a first predetermined level and for automatically rotating said movable reflector means from said second position to said first position when said temperature reaches a second predetermined temperature.

21. A thermal energy transfer device adapted for installation in an exterior wall or roof of a building structure, said energy transfer device comprising:
   at least one high thermal capacity collector for receiving and storing thermal energy, said collector extending generally in an axial direction and containing a high thermal capacity material therein;
   a movable thermal reflector associated with said collector having a thermally reflective concave inner surface facing toward said collector and extending generally parallel to but spaced from said collector, said inner surface having a focal locus spaced therefrom and extending in said axial direction, said collector being positioned generally along said focal locus of said inner surface, said inner surface being adapted to reflect thermal energy between said collector and the surroundings, said movable reflector further having a convex outer surface facing away from said collector and thermal insulation means disposed between said inner and outer surfaces;
   at least one fixed reflector disposed laterally of said movable reflector, said fixed reflector having a thermally reflective concave lateral surface facing toward said collector and extending in an axial direction generally parallel to but spaced from said collector, said lateral surface having a focal locus spaced therefrom and extending in said axial direction, said collector being positioned generally along said focal locus of said lateral surface, said lateral surface being adapted to reflect thermal energy between said collector and the surroundings, said fixed reflector further including thermal insulation disposed on the opposite side of said lateral surface from said collector;

an actuating apparatus for rotating said movable reflector about said collector to a first position wherein at least a portion of said movable reflector is positioned between said collector and the interior of building structure, to a second position wherein at least a portion of said movable reflector is positioned between said collector and the exterior of said building structure, or to any third position intermediate said first and second positions, said inner surface of said fixed reflector facing said collector as said movable reflector is rotated to or between either of said first and second positions.

22. A thermal energy transfer device according to claim 21, wherein said collector has a thermally absorptive outer surface.

23. A thermal energy transfer device according to claim 21, wherein said high thermal capacity collector comprises a generally hollow closed casing containing a phase change material therein, said phase change material have a phase change temperature in a comfort range of approximately 60 F. to approximately 90 F.

24. A thermal energy transfer device according to claim 23, wherein said casing has a thermally absorptive outer surface.

25. A thermal energy transfer device according to claim 21, wherein said high thermal capacity collector comprises a high-density material adapted to rise in temperature when exposed to thermal energy in order to store said thermal energy therein and adapted to release said stored thermal energy when exposed to surroundings having a level of said thermal energy lower than that of said stored thermal energy.

26. A thermal energy transfer device according to claim 25, wherein said high-density material is surrounded by a casing having a thermally absorptive outer surface.

27. A thermal energy transfer device according to claim 21, further comprising a generally rectangular frame structure including at least a pair of spaced-apart first frame members disposed laterally relative to said movable reflector and extending in an axial direction generally parallel to said collector, one of said lateral surfaces of said fixed reflectors being disposed along each of said first frame members, an exterior glazing barrier substantially sealingly attached to an exterior portion of said frame structure, said exterior glazing barrier being disposed between the exterior of said building structure and said collector, said frame structure further being adapted for installation of said energy transfer device in an opening in said wall or roof.

28. A thermal energy transfer device according to claim 27, wherein said frame structure further comprises a pair of spaced-apart second frame members interconnecting said spaced-apart first frame members, said actuating apparatus including pulley means rotatably attached to said second frame members and secured to said movable reflector, said pulley means further being rotatable relative to said collector in order to rotate said movable reflector about said collector.

29. A thermal energy transfer device according to claim 28, further comprising automatic control means for automatically rotating said movable reflector from one of said first and second positions to the other of said first and second positions in response to a predetermined temperature level between said movable reflectors and said exterior glazing barrier.

30. A thermal energy transfer device according to claim 27, including a plurality of said collectors and corresponding associated movable reflectors arranged in a number of laterally-adjacent pairs in said frame structure, said actuating apparatus being adapted to rotate the laterally-adjacent movable reflectors of each of said pairs in opposite directions between their respective first and second positions, each of said movable reflectors having sealing means on an edge portion thereof for mutually-abutting sealing engagement with one another when in their respective first and second positions, one of said fixed reflectors being located at each lateral end of said pairs of collectors and associated movable reflectors.

31. A thermal energy device according to claim 30, further including sealing means on at least one axial end portion of said movable reflectors for sealing engagement with said actuating apparatus and with said frame structure.

32. A thermal energy transfer device according to claim 21, further comprising automatic control means for automatically rotating said movable reflector from one of said first and second positions to the other of said first and second positions in response to predetermined radiant energy levels at the exterior of said building structure.

33. A thermal energy transfer device according to claim 21, wherein said actuation apparatus includes means for selectively adjusting the axial position of said movable thermal reflector in order to facilitate the free movement thereof.

34. A thermal energy transfer device according to claim 21, wherein said fixed reflector is resiliently deflectable and exerts a resilient biasing force directed generally toward said collector in order to maintain a slidingly and sealingly engagement between said fixed reflector and said movable reflector as said movable reflector is moved to or between said first and second positions, said fixed reflector deflecting in response to said sliding and sealing engagement.

35. A thermal energy transfer device according to claim 34, further comprising support means for said fixed reflector, and guide means for attaching said fixed reflector to said support means for limited slidable movement relative thereto in order to accommodate said deflection of said fixed reflector.

* * * * *

UNITED STATES PATENT AND TRADEMARK OFFICE
CERTIFICATE OF CORRECTION

PATENT NO. : 4,461,277

DATED : July 24, 1984

INVENTOR(S) : Jorge Pardo

It is certified that error appears in the above-identified patent and that said Letters Patent is hereby corrected as shown below:

Col. 3, line 13, after "formulated" insert --calcium--

Col. 3, line 31, "casung" should be --casing--

Col. 5, line 65, after "minimize" delete --the-

Col. 6, line 20, "Alteran-" should be --Alterna---

Col. 8, line 29, after "of" delete --the--

Col. 10, line 65, delete "said" (second occurrence) and insert therefor
(CL.10)           --and--

*Signed and Sealed this*

*Nineteenth* Day of *February 1985*

[SEAL]

*Attest:*

DONALD J. QUIGG

*Attesting Officer*   *Acting Commissioner of Patents and Trademarks*